United States Patent
Leblond et al.

[15] 3,696,949
[45] Oct. 10, 1972

[54] LOAD TRANSFER APPARATUS

[72] Inventors: Jean Leblond; Jean Biet, both of Compiegne, France

[73] Assignee: Uniroyal Englebert France S.A., Neuilly sur Seine, France

[22] Filed: July 16, 1970

[21] Appl. No.: 55,424

[30] Foreign Application Priority Data

July 21, 1969    France......................6924817

[52] U.S. Cl.............214/16.4 A, 214/38 B, 214/95 R
[51] Int. Cl................................................B65g 1/06
[58] Field of Search........214/6 G, 6 K, 16.4 A, 16.6, 214/309

[56] References Cited

UNITED STATES PATENTS

| | | | |
|---|---|---|---|
| 2,510,573 | 6/1950 | Gray........................ | 214/16.4 |
| 2,981,420 | 4/1961 | Johanson................... | 214/6 K |
| 3,067,457 | 12/1962 | Dennis et al.......... | 214/16.4 X |
| 3,157,301 | 11/1964 | McWilliams............... | 214/6 G |
| 3,244,303 | 4/1966 | Conner...................... | 214/309 |
| 3,343,689 | 9/1967 | Fehely...................... | 214/6 K |
| 3,351,216 | 11/1967 | Thomas et al.............. | 214/6 K |
| 3,368,702 | 2/1968 | Crile et al................. | 214/16.4 |
| 3,393,812 | 7/1968 | Mayo et al................. | 214/6 K |
| 3,432,045 | 3/1969 | Bauer....................... | 214/16.6 |
| 3,464,571 | 9/1969 | McWilliams............... | 214/6 G |

FOREIGN PATENTS OR APPLICATIONS 1,235,808    3/1967    Germany....................214/6 G

*Primary Examiner*—Gerald M. Forlenza
*Assistant Examiner*—Raymond B. Johnson
*Attorney*—Norbert P. Holler

[57] ABSTRACT

An automatic apparatus is disclosed for transferring separate loads or objects individually from the conveying means bringing them to a loading station onto a truck or like vehicle which has a plurality of vertically spaced horizontal compartment tiers and by means of which the loads can be transported to another location for further handling or processing. The apparatus includes a load-hoisting lift movable vertically reciprocally past the various levels of compartments on such a truck in controlled amounts determined by the number and sizes of the horizontal tiers, a horizontal platform for supporting the truck and indexing it horizontally past the lift by increments determined by the number and sizes of the objects to be disposed in side by side relation in each horizontal compartment, and means for transferring each load individually off the lift and into a respective compartment on the truck. This abstract is not to be taken as a complete exposition or as a limitation of the present invention, however, the full nature and extent of the invention being discernible only by reference to and from the entire disclosure.

13 Claims, 9 Drawing Figures

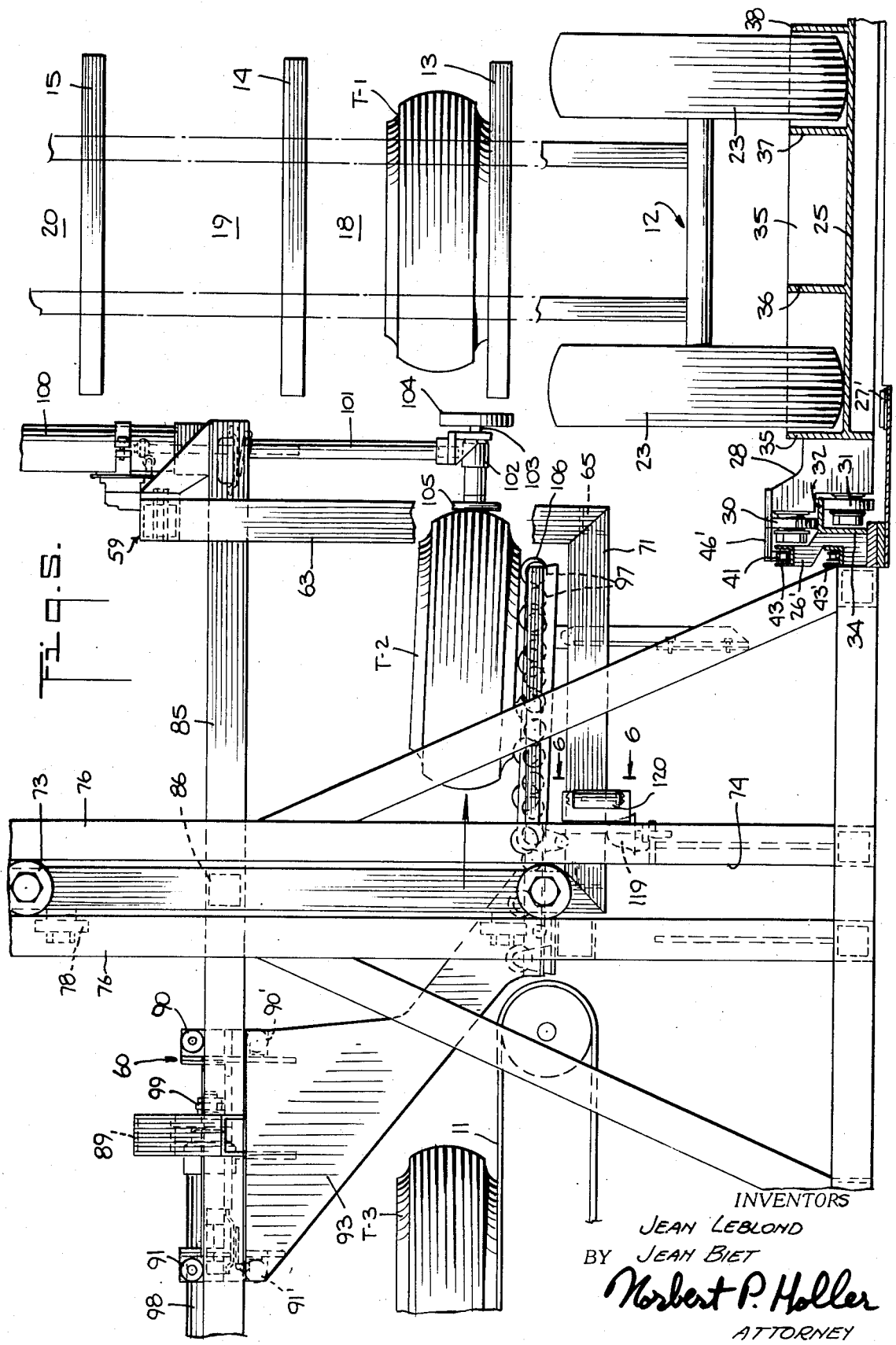

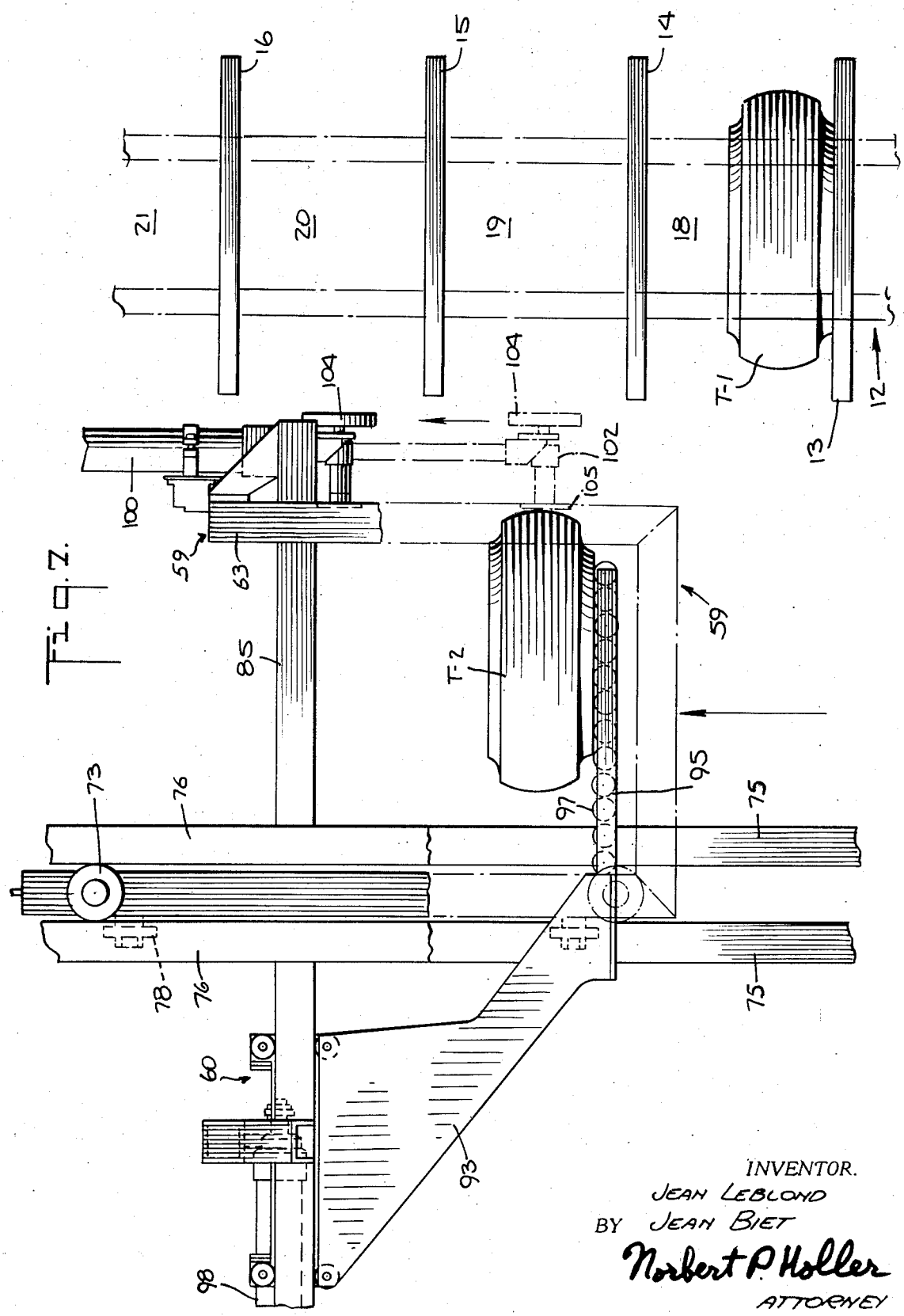

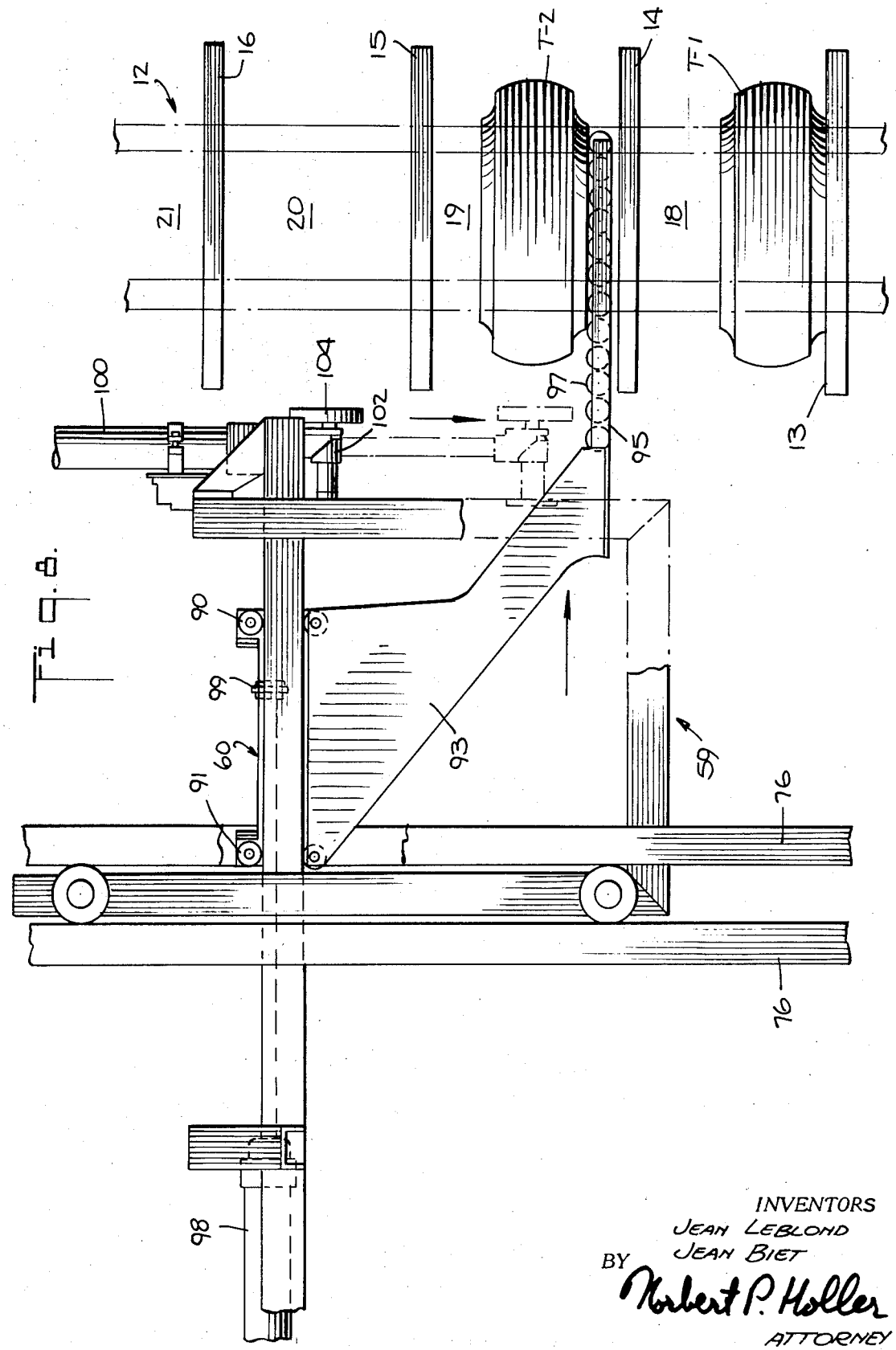

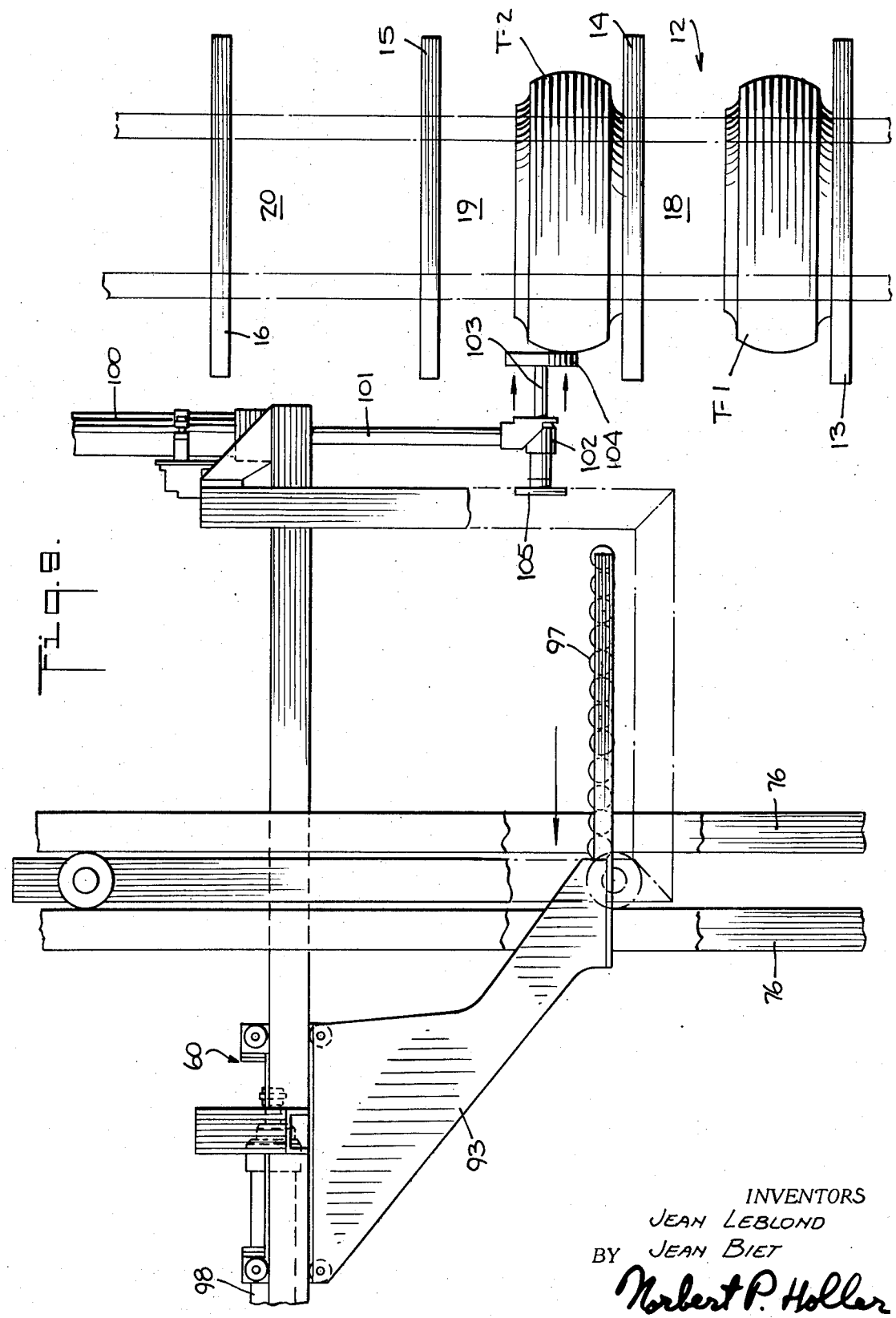

3,696,949

LOAD TRANSFER APPARATUS

This invention relates to automatic apparatus for transferring loads from one conveying device to another, for example from a belt or like conveyor to a multi-compartmented truck.

As will be seen from the following, the invention is of general utility in the arranging of diverse types of separate articles or loads, for example identical mass-produced objects which arrive individually at a transfer station, in a multi-compartmented movable receiving structure by means of which they can be transported to a different location for further processing. For the sake of simplicity, however, the invention will hereinafter be described, by way of example, as embodied in an apparatus finding particular applicability in the tire industry, for the transfer to and arrangement on a compartmented truck or like vehicle, of tire carcasses as they leave the building machine.

It is well known that in the tire industry, the manufacture of tires comprises at least two main phases, namely the production of the complete carcasses and the vulcanization thereof. These two phases generally are carried out in two different shops or sections of the factory, which means that the carcasses ready for vulcanization must be conveyed from the first location to the second, usually by means of suitable vehicles on which they are loaded and stored at the carcass-building machine section of the factory. In addition, in the manufacture of belted tires, the carcass production phase is itself generally subdivided into two separate parts, namely the building of cylindrical carcass bands and the shaping thereof into toroidal form for the application of the belt or breaker ply components. The two parts of this phase are also usually carried out at two different locations, which again necessitates the conveyance of the carcass bands from one place to the other, including the loading and arranging thereof on suitable transport vehicles. Although the operations involved in both the production of cylindrical carcass bands and the production of complete carcasses from the latter are constantly being automated more and more, with a concurrent reduction of manual operations, the handling of the carcasses leaving the production units and the loading thereof onto the storage and transport vehicles have remained, in most cases, largely dependent on expensive manual operations which, of course, constitute appreciable breaks in the flow of the mechanical and often automatic operations with which they are interspersed.

It is an object of the present invention, therefore, to provide means enabling these drawbacks and disadvantages of the known tire manufacturing operations to be efficaciously overcome.

A more particular object of the present invention is the provision of novel and efficient apparatus for automatically transferring tire carcasses emanating from one production stage to a compartmented truck or like vehicle for storage and transport to the next production stage, the apparatus requiring no manual intervention between the departure of the carcasses from the producing machine and their transfer to the transport vehicle.

Generally speaking, the objectives of the present invention are achieved by means of an apparatus characterized by the provision of a vertical load-hoisting conveyance device or lift which can move past the different levels of a plurality of vertically spaced, horizontal compartments of a tire carcass-transporting truck, a horizontal carriage or platform for supporting the truck and indexing it horizontally past the vertical lift in increments determined by the number and sizes of the vertical columns of tire carcasses to be loaded onto the truck, means for transferring each tire individually off the lift and into a respective compartment on the truck, and means for controlling the various elements of the apparatus to ensure sequential loading of a complete vertical column of carcasses onto the truck before the platform is indexed to bring the next empty column of spaces opposite the lift. The control means also prevent malfunctions by virtue of the provision of devices for sensing various operating conditions the existence of which may be a prerequisite for further operation or for interruption of the operation of the apparatus, as the case may be.

The foregoing and other objects, characteristics and advantages of the invention will be more clearly understood from the following detailed description of one embodiment thereof when read in conjunction with the accompanying drawings, in which:

FIG. 5 is an enlarged fragmentary partly sectional elevational view taken along the line 5—5 in FIG. 4 and illustrates the apparatus of FIG. 1 in a first stage of operation thereof;

Figure 1:
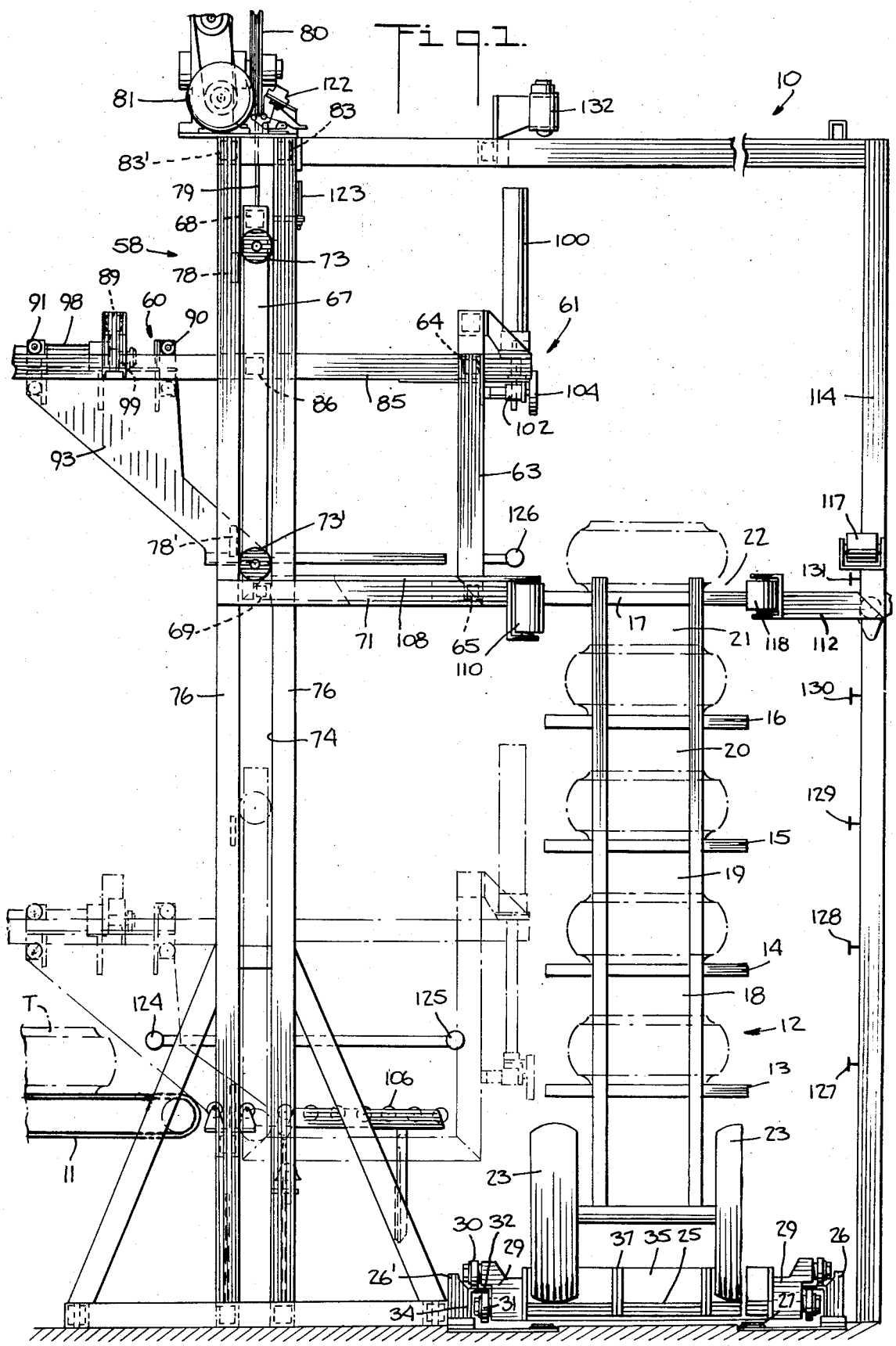
FIG. 1 is a fragmentary side elevational view of the overall apparatus according to the present invention.

FIG. 6 (found on the same sheet as FIG. 2) is a sectional view taken along the line 6—6 in FIG. 5; and FIGS. 7, 8 and 9 are enlarged fragmentary side elevational views of other sections of the apparatus shown in FIG. 1 and illustrate the same in subsequent stages of operation.

Referring now to the drawings in greater detail, the load-handling apparatus 10 (FIG. 1) is disclosed herein, by way of illustration, as used for transferring uncured shaped tire carcasses T from a suitable conveying mechanism, for example an endless belt conveyor 11 (as shown) or a roller conveyor (not shown) or the like, to a storage and/or transport truck or vehicle 12 provided with a plurality of vertically spaced, horizontal plates 13 to 17 defining a like number of horizontal compartments 18 to 22. The truck 12 is in the nature of a dolly, i.e. unmechanized, and is provided with two wheels 23 essentially midway of its length and a tow hitch or coupling arrangement 24 at one or both ends to enable it to be hooked to a tractor for movement from one place to another.

Figure 3:
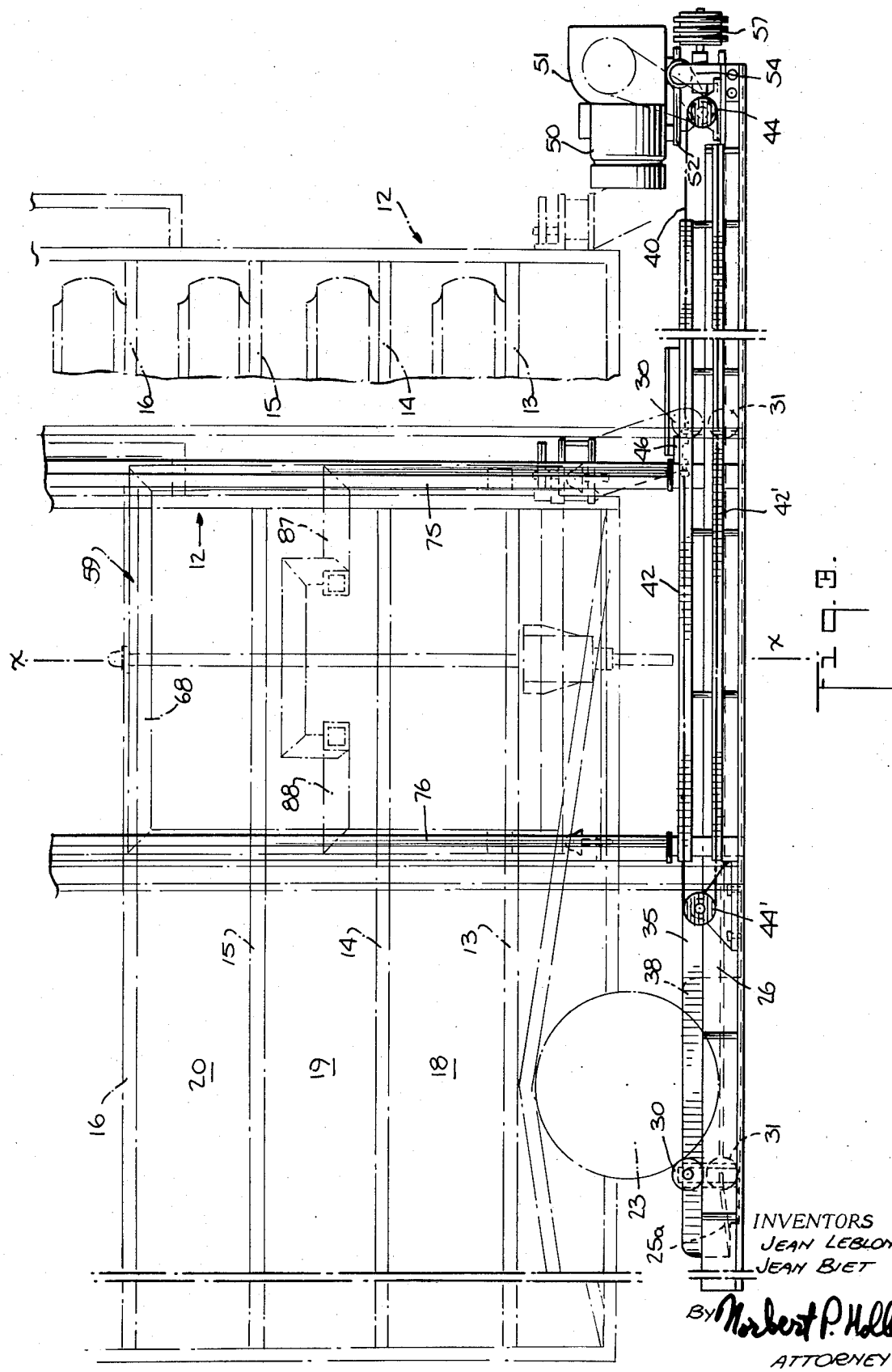
FIG. 3 is a fragmentary front elevational view of the horizontal truck-supporting and indexing mechanism of the apparatus.
Figure 4:
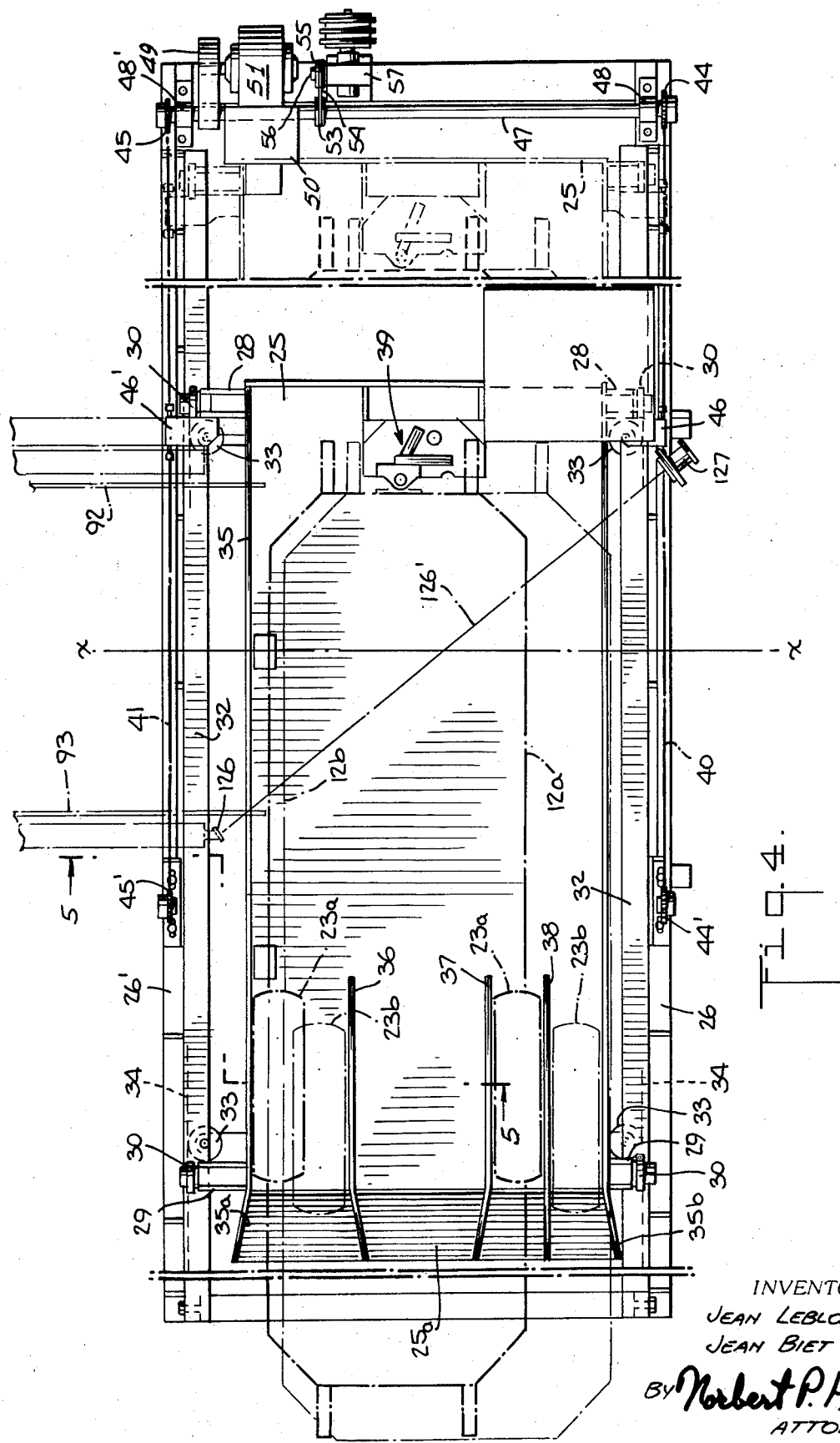
FIG. 4 is a fragmentary top plan view of the structure shown in FIG. 3.

For the purpose of supporting the truck during a loading operation, the apparatus includes a horizontal flatbed carriage or platform 25 movable transversely to the feed direction of the conveyor 11 along a guide track defined by a pair of parallel rails 26 and 26' (FIGS. 1, 4 and 5) rigidly bolted to the floor at 27 and 27'. The platform is provided adjacent its opposite ends with respective pairs of oppositely extending lateral rigid arms 28—28 and 29—29, each of which arms supports a respective pair of vertical wheels 30 and 31 in rolling engagement with the top and bottom surfaces of a horizontal web 32 of the associated rail 26 or 26′, and a respective horizontal wheel 33 (shown in FIG. 4 only) in rolling engagement with the inside face of a vertical web 34 of the associated rail 26 or 26′. The platform 25 is peripherally bounded, except at one end, by an upstanding wall 35. At the said open end, the platform slants down somewhat to provide a ramp portion 25a (FIG. 3), the respective portions 35a and 35b of the wall 35 flare outwardly somewhat, and the platform is further provided with upstanding generally parallel partitions 36, 37 and 38 the purpose of which will be more fully explained presently. At its closed end, the platform supports a latching device 39, e.g. a hook and pin arrangement, for locking the truck 12 to the platform. The length of the track 26—26′ is sufficient to enable the platform to be indexed therealong through a plurality of positions equal to the number of vertical columns of side by side spaces available in each truck to be loaded for receiving tire carcasses T from the transfer means still to be described.

The means for moving and indexing the platform 25 along the track 26—26′ comprise two sprocket chains 40 and 41 each having its upper and lower reaches slidably confined in respective upper and lower channels 42—42′ (FIG. 3) and 43—43′ (FIG. 5) provided in the associated rails 26 and 26′. The chains are trained around respective sets of sprocket wheels 44—44′ and 45—45′ and are fixed in their upper reaches to respective laterally projecting extensions or adjuncts 46—46′ of the arms 28. The sprockets 44 and 45 are fixed to the opposite ends of a transverse rotatable shaft 47 journaled in bearings 48—48′ (FIG. 4) mounted on the rear ends of the rails 26 and 26′. The shaft is arranged to be driven via a drive belt 49 by means of a suitable electric motor 50 and a gear reduction unit 51 mounted on a rigid support 52. The shaft 47 further carries a pulley 53 over which runs a belt 54 that is also trained over a pulley 55 mounted on a freely rotatable shaft 56 of an electro-magnetic brake unit 57, the latter being so interconnected with the control circuitry for the motor 50 as to be activated to stop the rotation of the shaft 56 and thereby to brake the shaft 47 whenever the motor 50 is shut off at the end of an indexing movement of the platform 25.

For the purpose of transferring the tires T from the conveyor 11 to the truck 12, the apparatus 10 includes a lift and charging unit 58 comprising a vertically movable frame 59 serving as the support for a horizontally reciprocally movable carriage 60 and for a vertically and horizontally adjustable abutment unit 61. The frame 59 (FIGS. 1 and 2) is substantially U-shaped and comprises a first assembly of two vertical struts 62 and 63 rigidly connected with one another by upper and lower horizontal side to side struts 64 and 65, and a second assembly of two vertical struts 66 and 67 rigidly connected with one another by upper and lower horizontal side to side struts 68 and 69, the two sets of vertical struts being rigidly connected with one another by horizontal front to rear struts 70 and 71.

The frame 59 is guided in its vertical movement by respective first pairs of rollers 72—72′ and 73—73′ mounted on the vertical struts 66 and 67 and slidably received in vertical tracks 74 defined by two pairs of vertical struts 75 and 76, and by respective second pairs of rollers 77—77′ and 78—78′ slidably engaging the inside faces of the vertical struts 75 and 76, which, as shown, constitute a part of the main framework of the apparatus 10. The upper horizontal strut 68, and thereby the entire U-shaped frame 59, is suspended at its center by a cable 79 wound on the pulley or drum of a winch 80 driven by a motor 81 and reduction gearing 82 and rigidly mounted atop the vertical struts 75 and 76 with the aid of horizontal struts 83 and 83′.

Figure 2:
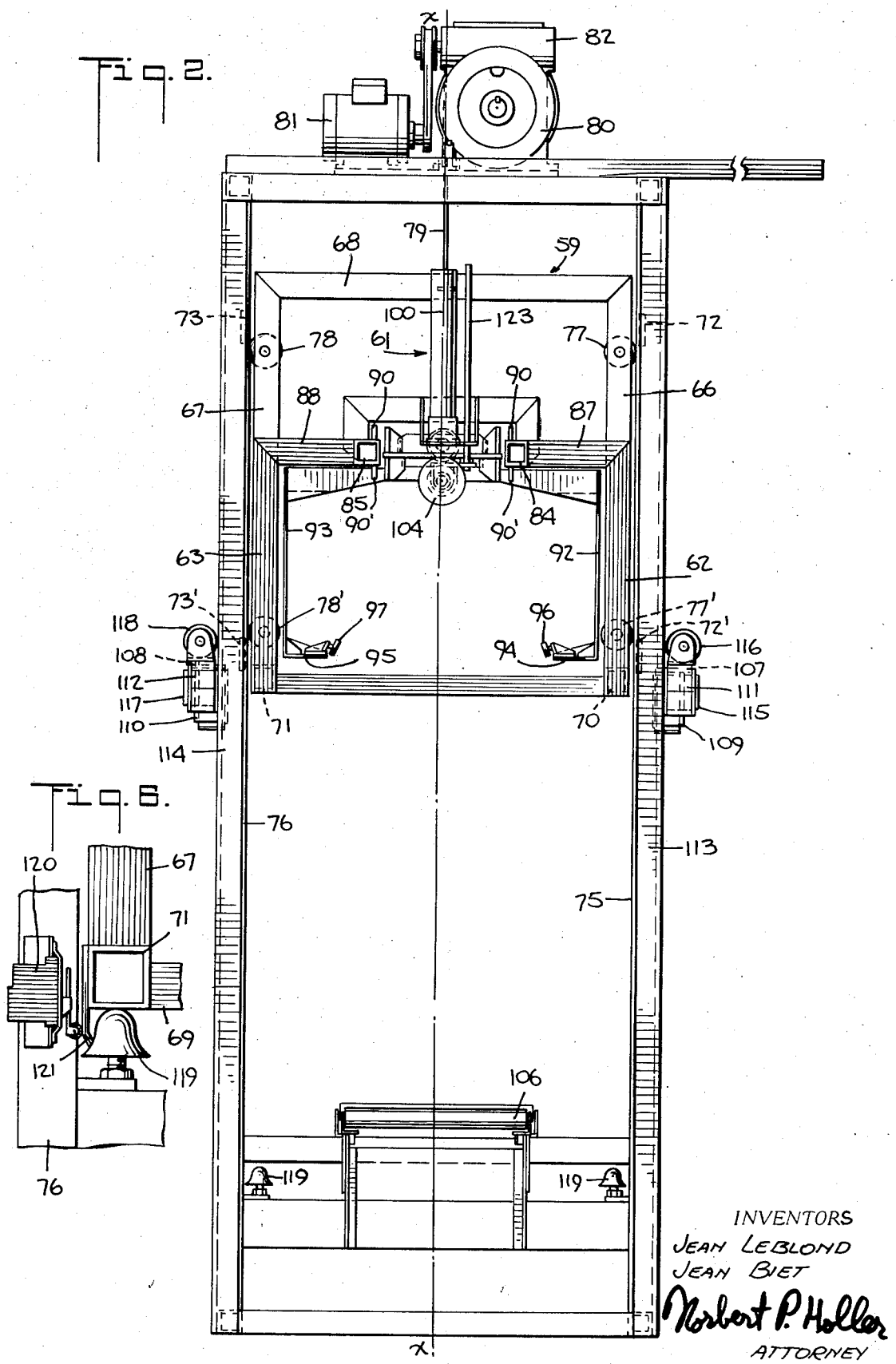
FIG. 2 is a fragmentary front elevational view of the vertical lift mechanism of the apparatus.

The frame 59 is further provided with a pair of front to rear extending horizontal beams 84 and 85 which are rigidly interconnected with the frame by means of intermediate horizontal struts 86 (FIG. 1) aligned with one another and on which the beams are mounted projectingly, and by means of two horizontal struts 87 and 88 aligned with one another and fixed projectingly at their remote ends to the vertical struts 62 and 63 at the uppermost ends of the latter (FIG. 2). The beams are further rigidly connected with one another intermediate their ends by a horizontal cross strut 89 (FIGS. 1 and 5) and at their ends remote from the vertical struts 62 and 63 by a further horizontal strut (not shown).

The carriage 60 is supported between the horizontal beams 84 and 85 and comprises at its front and rear ends respective pairs of top and bottom rollers or wheels 90—90′ and 91—91′ riding on the said beams which constitute the track for the carriage 60. The latter is provided with a pair of rigid lateral downwardly and frontwardly extending arms 92 and 93 to the lowermost ends of which are fixed respective horizontal arms 94 and 95 for supporting the loads to be transferred. These two arms, which constitute the side members of a structure in the nature of a fork, are disposed symmetrically with respect to the vertical center plane x—x of the lift and charging unit 58 and are provided with rollers 96 and 97 (not shown in FIG. 1) to facilitate a sliding relative movement of the loads and arms as will be more fully explained presently. The horizontal translation of the carriage 60 along the track 84–85 may be effected by any suitable means, for example by a double-acting fluid pressure cylinder and piston unit having the cylinder 98 rigidly connected to the beams and the free end of the piston rod 99 to the carriage 60.

The abutment unit 61 which is disposed at the ends of the beams 84 and 85 remote from the carriage-reciprocating cylinder 98 comprises a vertical double-acting cylinder 100 the piston rod 101 of which extends downwardly and supports at its free end another double-acting cylinder 102 oriented horizontally. The piston rod 103 of the cylinder 102 carries an abutment disc 104 at its free end, and a second abutment disc 105 is secured to the rear or blind end of the cylinder 102. The arrangement is such that the abutment disc 105 is located in a plane substantially flush with the front end 62-63 of the frame 59 and just frontwardly of the end of a short roller conveyor 106 rigidly mounted in the main frame of the apparatus symmetrical with the plane x—x and disposed at the level of the arrival path of the tires T on the conveyor 11. The width of the roller conveyor 106 is less than the spread of the forked supporting means 94-96 and 95-97 so that the latter can move past the sides of the conveyor 106.

The apparatus 10 further includes a number of guide, control and safety features some of which are only schematically indicated in some of the figures. Thus, the framework may be provided (FIGS. 1 and 2) with a pair of horizontal bars 107 and 108 rigidly connected to the vertical struts 75 and 76 and extending therefrom toward the path of movement of the truck 12, the bars 107 and 108 at their free ends carrying rollers 109 and 110 disposed at the level of one of the topmost of the plates 13 to 17 of the truck (they are shown in FIG. 1 at the level of the plate 17), and adapted to be engaged by one edge of the said plate. Cooperatingly, a pair of L-shaped members 111 and 112 are pivotally mounted on the vertical struts 113 and 114 of the framework, each such member having one short and one long arm at the free ends of which are provided respective rollers 115–116 and 117–118 adapted selectively to engage the other side edge of the plate 17 of the truck 12. The opposed rollers thus provide additional guide means for the truck. The adjustability afforded by the pivotal members 111 and 112 is one of the features which makes the apparatus adapted to the loading of trucks 12 of different sizes, as indicated in phantom outline at 12a and 12b in FIG. 4. The other feature which is provided with this adaptability in mind is the hereinbefore adverted to arrangement of the partitions 36, 37 and 38 on the platform 25, the purpose of this arrangement being to define the appropriate locations of the wheels 23 of the truck on the platform depending on the size of the truck, as indicated in phantom outline in FIG. 4 at 23a for the wheels of the smaller truck 12a and at 23b for the wheels of the larger truck 12b.

The framework of the apparatus is also provided with a pair of bumpers or stops 119 defining the bottom position or end of downward travel of the lift frame 59 (FIGS. 1, 2, 5 and 6). At that location also there is provided a bottom limit switch 120 (FIGS. 5 and 6) actuatable by an arm 121 carried by and extending downwardly from the frame 59. Correspondingly, a top limit switch 122 (FIG. 1) is provided at the upper end of the part of the framework constituted by the vertical struts 75 and 76, this switch being actuatable by a rod 123 carried by and extending upwardly from the frame 59. Both of these switches are connected in a suitable electrical control circuit (not shown) for the operating means of the apparatus, i.e. the platform motor 50, the lift motor 81, the motor (not shown) for the conveyor belt 11, and the fluid pressure devices 98, 100 and 102.

In addition, the apparatus is provided (FIG. 1) with a photoelectric cell 124 disposed in the vicinity of the discharge end of the conveyor belt 11 in such a way that the light beam incident thereon from a suitable source (not shown) will be intercepted by the tire carcasses T placed on the said belt as they reach the belt end, with a photoelectric cell 125 disposed in the vicinity of the discharge end of the roller conveyor 106 in such a way that its light beam (source not shown) will be intercepted by the carcass T when the same reaches that position, and with a photoelectric cell 126 disposed at the bottom of one of the struts 62 or 63 of the frame 59 at the level of the fork arms 94 and 95. The photoelectric cell 126 is adapted to be subjected selectively to the light beams emitted by one or another of a plurality of light sources 127 to 131 disposed on one of the vertical struts 113 or 114 of the frame work at the levels of the various truck compartments 18 to 22, the arrangement being such that the said light beams cross the truck diagonally, as indicated by the broken line 126' in FIG. 4, and will each be intercepted by a respective carcass which is facing the lift on the corresponding one of the plates 13 to 17. The several light sources 127 to 131, of course, can advantageously be replaced by mirrors adapted to reflect to the cell 126 the beams emitted by a single light source integral with the said cell. These photocells are also connected into the control circuit of the apparatus, controlling in a suitably interlocked fashion the energization circuits for the conveyor belt motor control relays, for a pair of memory devices (e.g. latch control relays) responsive to the passage of each carcass off the conveyor belt and to the arrival of each carcass on the fork arms 94–95, for the lift motor control relays, for the platform motor control relays, and for the various solenoid valves arranged to effect the activation of the cylinders 98, 100 and 102, i.e. the protraction and retraction of the fork arms 94–95, the lowering and raising of the piston rod 101, and the protraction and retraction of the piston rod 103.

The control circuit also includes means for automatically deenergizing the platform motor 50 and energizing the brake 57 as soon as the motor, upon being activated, has advanced or indexed the platform 25 by one step, i.e. a distance equal to somewhat more than the diameter of the tire carcasses then being loaded onto the truck. It will be understood that the activation of the platform motor is also controlled by relays responsive to the accumulation of a complete vertical column of tire carcasses in the truck. The motor 50 is, of course, arranged to index the platform through the requisite number of positions equal to the number of columns of spaces available in the truck, and safety relay means are provided to prevent further reverse or forward activation of the motor when the platform has reached either the first or the last available position shown in solid lines and in phantom outline, respectively, in FIG. 4.

The control circuit has not been explicitly illustrated in the drawings, since the arrangement and interconnection of the various instrumentalities hereinbefore referred to, so as to enable the apparatus to function automatically in the manner now to be described, will be within the ken of those skilled in the art.

In operation, the apparatus for the purposes of this description is assumed to be in the condition illustrated in FIG. 5, with a carcass T-1 on the bottom plate 13 of the truck 12 as the result of a prior transfer and loading cycle. The lift frame 59 is again in its lowermost position, and the fork arms 94–95 are retracted and disposed to either side of the roller conveyor 106, with the tops of their rollers 96–97 being disposed just below the tops of the rollers of the conveyor 106. Concomitantly, the cylinder 102 is deactivated and the cylinder 100 has been activated to dispose the abutment disc 105 opposite the discharge end of the roller conveyor, and a second carcass T-2 has been fed onto the roller conveyor 106 (all carcasses are wider than the roller conveyor) and against the abutment 105 by the belt conveyor 11. The latter has already advanced the next carcass T-3 to its discharge position, but has been brought to a stop. The platform 25 is stationary, of course, and (merely by way of example) in the first position thereof, i.e. the first column of tire carcasses is being loaded into the truck.

It is to be noted, in this connection, that when a tire carcass is brought by the conveyor belt 11 to the lift 58, the photocell 124 (not shown in FIG. 5) will memorize, i.e. respond to, the passage of the carcass. This will either stop the belt if the preceding carcass is still on the roller conveyor 106 and waiting to be taken up by the still unelevated frame 59 and carriage 60, or it will stop the belt if the carriage 60, whether the fork arms 94–95 are loaded or not, is not in its lowermost position, or it will allow the belt to continue running and the carcass to pass onto the roller conveyor if there is no carcass on it already and if the carriage 60 is at its lowermost position. In the latter case, of course, the arrival of the carcass on the roller conveyor 106 darkens the photocell 125, which permits an immediate stopping of the belt 11 and the starting of the upward movement of the lift frame 59.

Reverting now to the cycle in progress, once the carcass T-2 is in the FIG. 5 position and has been sensed by the photocell 125 (not shown in FIG. 5), the lift motor 81 is energized to commence raising the frame 59 and therewith the carriage 60, so that as the fork arms 94–95 pass the roller conveyor, they engage the lateral portions of the carcass projecting beyond the sides of the roller conveyor 106 and lift the carcass T-2 off the roller conveyor and take it along (FIG. 7). This movement continues until the lift reaches the level of the first compartment not occupied by a tire carcass, in the instant case this is the compartment 19, at which time the light from the source 128 (not shown in FIGS. 5 and 7) is incident on the photocell 126. This causes the motor 81 to be deenergized, stopping the frame 59 at this level (which, it will be understood, could not happen at the lower level of the compartment 18 where the light from the source 127 was blocked from reaching the photocell 126 by the carcass T-1 lying on the plate 13).

The light falling on the photocell further and in sequence causes the cylinder 100 to be activated to retract the abutment or stop unit 102–104–105 from the broken-line position to the solid-line position thereof shown in FIG. 7, the cylinder 98 to be activated to displace the carriage 60 frontwardly so as to bring the fork arms 94–95 and the carcass T-2 carried thereby into overhanging relation to the plate 14 within the confines of the compartment 19 (FIG. 8), the cylinder 100 to be activated again in the reverse sense to protract the abutment or stop unit 102–104–105 back from the solid-line position to the broken-line position shown in FIG. 8, the cylinder 102 to be activated to protract the abutment or stop 104 toward the carcass T-2 on the fork arms 94–95 (FIG. 9), the cylinder 98 to be activated again in the reverse sense to retract the carriage 60 into its starting position and the fork arms from under the carcass T-2 while the same is restrained by the abutment 104, which causes the carcass to drop onto the plate 14 (FIG. 9), and finally the cylinder 102 to be activated again in the reverse sense to retract the abutment 104 into the solid-line position thereof shown in FIG. 5. The control circuit is then conditioned to effect the reverse energization of the lift motor 81 so as to lower the frame 59 back into its starting position shown in FIG. 5, whereupon the activation of the limit switch 120 conditions the control circuit for the next loading cycle, which commences with the reactivation of the belt conveyor 11 to feed the carcass T-3 into the lift 58 and onto the roller conveyor 106.

The operations described above are then repeated in the same manner until the first column of spaces on the plates 13 to 17 of the truck are entirely occupied by respective tire carcasses, the number of such carcasses in this column being equal to the number of superposed plates of the truck 12, for example five as represented in FIG. 1. When the lift frame 59 reaches the uppermost level where the last carcass in the column being loaded is to be deposited, the rod 123 activates the upper limit switch 122 which causes the platform motor control relays to be conditioned for energization. Upon completion of this conditioning by the next activation of the bottom limit switch 120 by the arm 121 when the empty lift frame again reaches its lowermost position shown in FIG. 5, the platform motor 50 is energized to index the platform 25 by one step, at the end of which the next empty column of spaces on the truck is positioned opposite the lift and ready to receive the second series of tire carcasses. A new loading cycle is then able to begin, and the same operations as above described are then repeated for this second column, and subsequently for the other columns until the truck compartments are completely filled with tire carcasses. The truck is then withdrawn from the platform 25 and replaced by another, which the apparatus according to the present invention will proceed to load with carcasses in the same way as the first one.

The operating safety of the apparatus can be further enhanced by disposing an additional photoelectric cell 132 (FIG. 1) on the main framework in position to receive a vertical light beam aimed between the lift frame 59 and the truck 12 from a suitable source (not shown). Thus, should it happen that in the course of the vertical displacement of the lift frame, a part of the carriage 60 or of an object carried thereby accidentally projects beyond the frame to an extent that it might come in contact with the truck plates, this would be immediately detected or sensed by such photocell which, through appropriate connection thereof into the control circuit, would immediately deenergize the lift motor control relays and stop the ascent or descent of the lift frame.

It will be understood that the foregoing description of a preferred embodiment of the present invention is for purposes of illustration only, and that the various structural and operational features herein disclosed are susceptible to a number of modifications and changes none of which entails any departure from the spirit and scope of the present invention as defined in the hereto appended claims. Thus, the load-holding means constituted by the frame 59 and carriage 60 could have its load-accepting position at the top end of its path of vertical movement rather than at the bottom end as shown, so as to load the truck or storage structure 12 from the top down. Also, the truck may be driven, i.e. indexed, directly by the motor 50 rather than through the intermediary of the platform 25. The load-accepting table structure constituted by the roller conveyor 106 may also be somewhat otherwise constructed, subject only to its being narrower than the loads to be supported thereby and the spacing of the fork arms 94–95. Likewise, other arrangements of the stop means engageable with the loads for impeding the reverse movements thereof with the fork arms out of the truck may be employed in lieu of the abutment unit 61. Still other variants of the different parts of the apparatus will readily suggest themselves to those skilled in the art.

Having thus described the invention, what is claimed and desired to be secured by Letters Patent is:

1. Apparatus for transferring a plurality of loads individually into a storage structure having a plurality of vertically spaced horizontal plates defining therebetween a column of load-receiving compartments, comprising:
   a. load-holding means arranged at a loading station
      1. for vertical reciprocal movement along a path spaced from the location of said column of compartments and between a single load-accepting position and each of a series of vertically spaced load-transferring positions the levels of which correspond to those of said compartments of said storage structure, and
      2. for horizontal reciprocal movement in a direction transverse to said path and between respective retracted and protracted positions out of and in said column of compartments;
   b. first sensing means for sensing the presence or absence of a load in each of said compartments;
   c. first operating means operatively connected with said load-holding means for displacing the same vertically along said column of compartments, with said load-holding means in said retracted position thereof,
      1. out of said load-accepting position and toward any given load-transferring position when a load being transferred is located on said load-holding means, and
      2. out of any given load-transferring position and back to said load-accepting position when a load being transferred has been removed from said load-holding means,
   said first sensing means being operatively connected with said first operating means for deactivating the latter during said vertical movement of said load-holding means at the level of the first compartment sensed to be empty;
   d. second operating means connected with said load-holding means for sequentially displacing the same horizontally when stopped at a load-transferring position opposite an empty compartment,
      1. out of said retracted position and into said protracted position thereof for shifting the load then on said load-holding means into the confines of the then opposed empty compartment, and
      2. out of said protracted position and back into said retracted position thereof; and
   e. stop means movable, selectively, with said load-holding means along a path intermediate said column of compartments and said path of vertical movement of said load-holding means, as well as both vertically and horizontally relative to said load-holding means, for engaging that portion of the load on said load-holding means directed toward said protracted position of the latter during said vertical movement of said load-holding means so as to retain the load on the latter, and for engaging that portion of the load on said load-holding means directed toward said retracted position of the latter when said load-holding means is in said protracted position thereof so as to impede any return movement of the load out of said opposed compartment during the displacement of said load-holding means back into said retracted position thereof by said second operating means.

2. Apparatus according to claim 1, further comprising third operating means operatively connected with said first sensing means for indexing said storage structure horizontally, along a path transverse to both the path of vertical movement of said load-holding means and the direction of horizontal movement of the same, after the sensing, by said first sensing means, of the transfer of a respective load into each section of a given column of sections of said compartments, thereby to dispose an empty column of sections of said compartments opposite said path of vertical movement of said load-holding means.

3. Apparatus according to claim 2, further comprising a platform arranged for horizontal movement in said transverse path, said platform being adapted to support said storage structure, and said third operating means being connected with said platform.

4. Apparatus according to claim 3, said third operating means being constructed and arranged to enable said platform to be indexed in equal steps of predetermined length depending on the widths of said loads and the number of laterally adjacent columns of compartment sections of appropriate width available in said storage structure.

5. Apparatus according to claim 3, said platform being provided with means for selectively guiding and adjustably laterally positioning said storage structure on said platform and relative to said load-holding means in dependence on the width of said storage structure.

6. Apparatus according to claim 5, further comprising adjustable guide roller means rigidly mounted adjacent the path of horizontal movement of said platform for engagement with the opposed lateral edges of a selected one of said plates of said storage structure.

7. Apparatus according to claim 1, further comprising conveyor means for feeding said loads to said load-accepting position of said load-holding means, fourth operating means for driving said conveyor means, second sensing means for sensing the presence or absence of a load at the location of transfer of loads from said conveyor means to said load-holding means, and third sensing means for sensing the presence or absence of a load at said load-accepting position of said load-holding means, said second and third sensing means being operatively connected with said fourth operating means to enable activation of said conveyor means only upon location of said load-holding means in an empty state at said load-accepting position.

8. Apparatus according to claim 1, said stop means comprising a horizontally oriented dual back to back abutment structure, fifth operating means for reciprocally displacing said abutment structure vertically relative to said load-holding means so as to selectively dispose said abutment structure in and out of the path of horizontal movement of a load supported by said load-holding means as the latter is moved horizontally by said second operating means, and sixth operating means for reciprocally displacing that portion of said abutment structure facing toward said protracted position of said load-holding means horizontally relative to that portion of said abutment structure facing toward said retracted position of said load-holding means, said last-named portion of said abutment structure providing the retaining function, and said first-named portion of said abutment structure providing the impeding function, for said stop means.

9. Apparatus according to claim 1, said load-holding means comprising a frame mounted for vertical movement, and a load-supporting carriage mounted on said frame for horizontal movement relative thereto, said first operating means being connected with said frame, and said second operating means being connected with said carriage.

10. Apparatus according to claim 9, said first operating means comprising a motor-driven winch including a pulley, and a cable passed about said pulley and connected to said frame, and said second operating means comprising a fluid pressure piston and cylinder unit having one member thereof connected to an adjunct of said frame and the other member connected to said carriage.

11. Apparatus according to claim 9, further comprising a table structure located at said load-accepting position of said load-holding means for supporting each load to be transferred, and said carriage comprising a pair of substantially horizontal fork arms extending toward the location of said storage structure and adapted to support a load when the same is disposed in bridging relation to said fork arms, said table structure being somewhat narrower than said loads to enable each of the latter to project laterally of said table structure when supported thereby, and said fork arms being spaced apart somewhat more than the width of said table structure and in said load-accepting position of said load-holding means being disposed somewhat below the level of said table structure.

12. Apparatus according to claim 11, further comprising conveyor means aligned with said table structure for feeding said loads to the same, fourth operating means for driving said conveyor means, second sensing means for sensing the presence or absence of a load at the location of transfer of loads from said conveyor means to said table structure, third sensing means for sensing the presence or absence of a load on said table structure, and fourth sensing means for sensing the location of said load-holding means in said load-accepting position, said second, third and fourth sensing means being operatively connected with said first and fourth operating means to enable activation of said fourth operating means to drive said conveyor means only upon location of said fork arms below the level of said table structure with no load on the latter, and to enable activation of said first operating means to move said frame and therewith said carriage vertically out of said load-accepting position only upon location of said fork arms below the level of said table structure with a load on the latter.

13. Apparatus for automatically transferring a plurality of loads individually into a movable storage structure having a plurality of vertically spaced horizontal plates defining therebetween a column of load-receiving compartments, comprising:

a. a platform arranged at a loading station for horizontal stepwise movement along a first path, said platform being adapted to support said storage structure so as to dispose said plates of the latter in respective load-receiving positions;
 b. load-holding means arranged at said loading station
  1. for vertical reciprocal movement along a second path spaced from said first path and between a single load-accepting position and each of a series of vertically spaced load-transferring positions the levels of which correspond to those of said compartments of said storage structure, and
  2. for horizontal reciprocal movement in a direction transverse to said first path and between respective retracted and protracted positions out of and in overhanging relation to said platform;
 c. means for sensing the presence or absence of a load in each section of a column of sections of said compartments when juxtaposed to said second path of movement of said load-holding means;
 d. first drive means operatively connected with said load-holding means for displacing the same vertically along said column of sections of said compartments, with said load-holding means in said retracted position thereof,
  1. out of said load-accepting position and toward any given load-transferring position when a load being transferred is located on said load-holding means, and
  2. out of any given load-transferring position and back to said load-accepting position when a load being transferred has been removed from said load-holding means,
 said sensing means being operatively connected with said first drive means for deactivating the latter during said vertical movement of said load-holding means at the level of the first compartment section sensed to be empty;
 e. operator means connected with said load-holding means for sequentially displacing the same horizontally when stopped at a load-transferring position opposite an empty compartment section,
  1. out of said retracted position and into said protracted position thereof for shifting the load then on said load-holding means into the confines of the then opposed empty compartment section, and
  2. out of said protracted position and back into said retracted position thereof;
 f. abutment means movable, selectively, with said load-holding means along a path intermediate said second path and said column of compartment sections, as well as both vertically and horizontally relative to said load holding means, for engaging that portion of the load on said load-holding means directed toward said protracted position of the latter during said vertical movement of said load-holding means so as to retain the load on the latter, and for engaging that portion of the load on said load-holding means directed toward said retracted position of the latter when said load-holding means is in said protracted position thereof so as to impede any return movement of the load out of said opposed compartment section during the displacement of said load-holding means back into said retracted position thereof; and g. second drive means operatively connected with said platform for indexing the same one step at a time horizontally along said first path, said sensing means being operatively connected with said second drive means for activating the latter whenever all compartment sections in said column are full, so as to bring the next adjacent column of sections of said compartments into juxtaposition to said second path of movement of said load-holding means.

* * * * *